United States Patent [19]

Ohtake et al.

[11] Patent Number: 4,785,442

[45] Date of Patent: Nov. 15, 1988

[54] LIGHT SPOT POSITION CONTROL SYSTEM AND METHOD BY SAMPLING SERVO

[75] Inventors: Masatoshi Ohtake, Ome; Seiji Yonezawa, Hachioji; Toshiaki Tsuyoshi, Kokubunji; Wasao Takasugi, Higashiyamato; Takashi Takeuchi, Fujisawa, all of Japan

[73] Assignee: Hitachi, Ltd., Tokyo, Japan

[21] Appl. No.: 72,095

[22] Filed: Jul. 10, 1987

[30] Foreign Application Priority Data

Jul. 11, 1986 [JP] Japan .................. 61-161837

[51] Int. Cl.⁴ ................. G11B 7/00; G11B 21/10
[52] U.S. Cl. ..................................... 369/44
[58] Field of Search ............... 369/43, 44, 45, 46; 358/342; 250/201 DF, 202

[56] References Cited

U.S. PATENT DOCUMENTS

| | | | |
|---|---|---|---|
| 4,321,700 | 3/1982 | Russell | 369/44 |
| 4,408,314 | 10/1983 | Yokota | 369/46 |
| 4,467,462 | 8/1984 | Shibata | 369/45 |
| 4,504,937 | 3/1985 | Yonezawa et al. | 369/44 |
| 4,544,838 | 10/1985 | Musha et al. | 369/44 |
| 4,564,929 | 1/1986 | Yonezawa et al. | 369/44 |
| 4,593,386 | 6/1986 | Kuwabara et al. | 369/46 |
| 4,661,942 | 4/1987 | Yoshimoto et al. | 369/44 |
| 4,682,314 | 7/1987 | Nakagaki et al. | 369/44 |
| 4,707,816 | 11/1987 | Yonezawa et al. | 369/44 |

OTHER PUBLICATIONS

Abstract for the 45th Meeting of the Japan Society of Applied Physics, 13P-E-8 & 13P-E-9, (no translations).

Primary Examiner—Donald McElheny, Jr.
Attorney, Agent, or Firm—Antonelli, Terry & Wands

[57] ABSTRACT

A light spot position control system of the invention uses an optical disc in which a servo area and a data area are alternately formed along a rotating direction of a rotary recording medium, wherein error signals obtained from the servo areas are sampled, the latest sample value is compared with at least one-preceding sample value, a check is made to see if the latest sample value is correct or incorrect, and when the latest sample value is decided to be incorrect, the preceding error signal held is directly used as a light spot position control signal without updating the current error signal holding value.

7 Claims, 8 Drawing Sheets

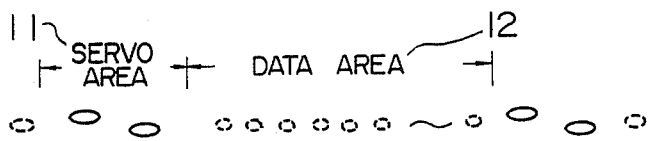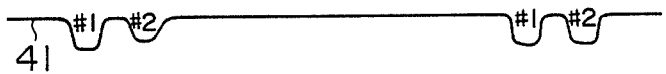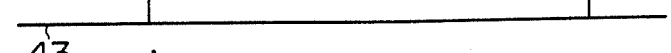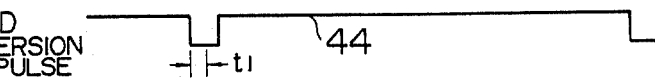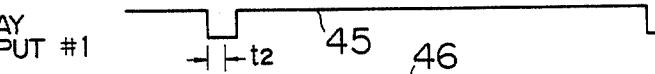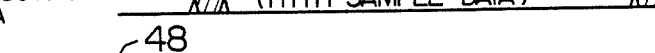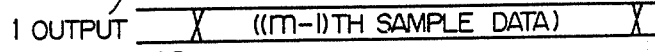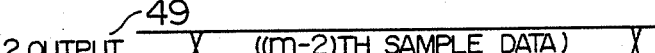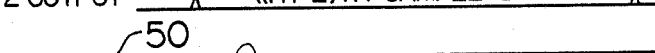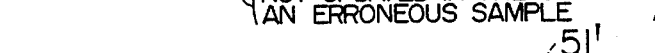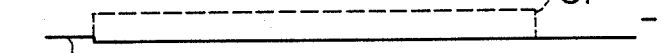

LIGHT SPOT POSITION CONTROL SYSTEM AND METHOD BY SAMPLING SERVO

BACKGROUND OF THE INVENTION

The present invention relates to a light spot position control system and method by a sampling servo in which a light spot position control to perform a focusing control and/or a tracking control of a light spot which is focused onto a recording medium is executed on the basis of servo signals which are derived as sampled signals from servo areas which are intermittently provided in the recording medium.

In an optical memory device for writing data into an arbitrary recording area (data area) on a recording medium such as an optical disc or the like and for reading out data from an arbitrary recording area, it is necessary to perform a light spot position control to accurately control the positional relation between the recording surface and a light spot which is focused onto the recording surface. As such a kind of light spot position control, an auto-focusing control for allowing a light spot to track the vertical motion of a recording medium and a tracking control for allowing a light spot to track the movement of a track on a recording medium have been known. Recently, there has been proposed a sampling servo system in which a servo area and a data area are alternately formed along a track on a recording medium, a position of a light spot is controlled using servo signals which are derived as sampled signals from the servo areas, and data is recorded and reproduced data into/from the data areas. As an example of a light spot position control system of the sampling servo type, there have been known U.S. Pat. No. 4,564,929 and "Data File Optical Disc of the Sector Servo System", the Abstract for the 45th meeting of The Japan Society of Applied Physics, 13P-E-8 and 13P-E-9.

It is a feature of the sampling servo system that in a servo system of a focusing control and a tracking control, servo signals (error signals) are not continuously detected but are obtained as sampled signals from the servo areas which are intermittently formed, and these servo signals are held for an interval corresponding to the data areas. Therefore, there is an advantage such that the servo signals are not influenced by the data areas. For example, in the recording mode to record data pits into a data area, in general, a recording pulse light of an intensity which is about ten times as powerful as that in the reading mode enters a photo detector. Thus, in the case of a continuous control, there is a fear such that the servo system for focusing and tracking is disturbed by the recording pulse light. However, in the sampling servo system, since the signals other than the signals detected at sample points are not used, the servo system is not influenced by the recording pulse light. On the other hand, in general, in an optical memory device such as an optical disc or the like into which data pits are recorded by a thermal energy of a light spot, the optical characteristics such as a reflection factor and the like in a data area after recording change as compared with those before recording. Therefore, the characteristics of the control system in the case of a continuous control are changed by those influences. However, in the sampling servo system, it is not influenced by a characteristic change of the data area and there is an advantage such that the servo system can be stabilized.

However, a conventional sampling servo technique is constructed on the assumption that the servo signals were always correctly detected and does not take a sufficient countermeasure for a detection error (sampling error) of servo signals due to scratch, dirt, or defect of the recording surface, electrical noises of the servo system, or the like. Therefore, there is a problem such that if the servo signal has a detection error, this error is not corrected but remains in at least the next servo signal to be sampled, so that the control characteristics of the servo system are disturbed and a control system having a predetermined performance cannot be constituted. For example, in the tracking servo system, even when the erroneous sample value was held for only one sample period, this state is equivalent to that a large acceleration was applied to an actuator for tracking, so that a light spot is deviated from the center of the track for a long time.

SUMMARY OF THE INVENTION

It is an object of the present invention to provide a light spot position control system by a sampling servo and an optical memory device using such a control system in which even if a detection error (sampling error) occurred in servo signals due to the foregoing causes, an influence by the detection is minimized and the stable control characteristics are assured, and the accuracy and reliability of the control characteristics are improved.

This object is accomplished by a method whereby a check is made to see if the latest sample value detected from servo areas which are intermittently provided lies within an allowable deviation range which is determined on the basis of at least the preceding sample value or not, and if it falls within the range, the detected latest sampled value is decided to be correct and is used as a light spot position control signal, and if it is out of the range, the detected latest sampled value is determined to be an erroneous value and is not used as a light spot position control signal, but a light spot position control signal is generated on the basis of at least the preceding sample value. According to the invention, on the basis of the nature such that a detection error of servo signals does not so frequently occur, namely, a detection error hardly occurs in the ordinary control state, an allowable deviation range of the servo signals in the normal control state is presumed from at least one-preceding sample value, and by discriminating whether or not the latest sample value detected from the servo areas lies within the allowable deviation range, it is decided whether the latest sample value is correct or incorrect. In accordance with the result of the decision, a light spot position control signal is generated on the basis of either the detected latest smaple value or the prediction value which was predicted from at least one-preceding sample value. As a prediction value, the detection sample value which was decided to be correct at a one-preceding sample point may be directly used, or it is also possible to use a prediction value obtained by using a curve which is derived from a plurality of past sampled values by such as a method of least squares or by using a linear prediction method.

BRIEF DESCRIPTION OF THE DRAWINGS

FIGS. 5a to 5p are waveform diagrams in respective sections in FIG. 4;

DESCRIPTION OF THE PREFERRED EMBODIMENTS

Figure 2A:
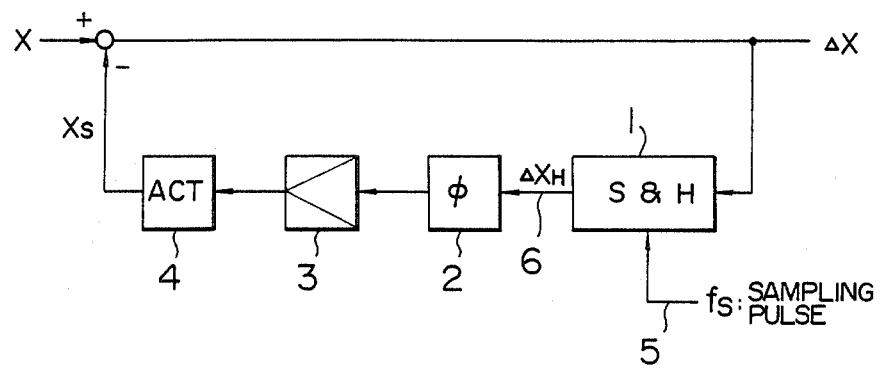
FIGS. 2a and 2b are a block diagram showing a general constitution of a tracking control system of the sampling servo type and a waveform diagram thereof.
Figure 2B:
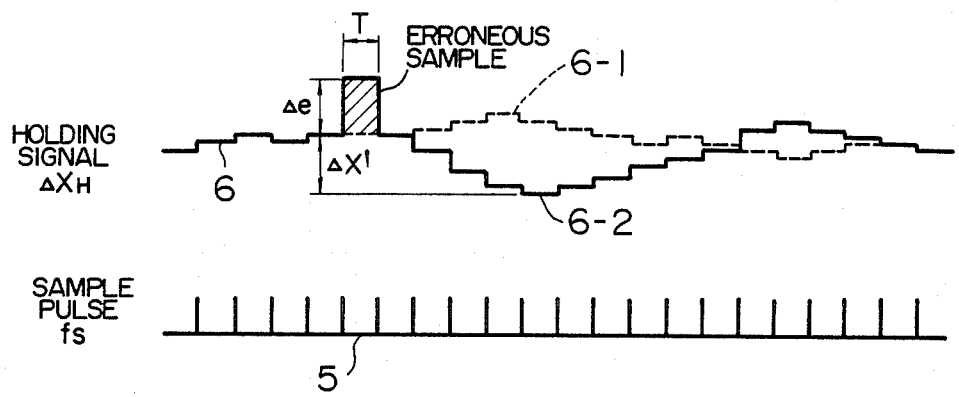

FIGS. 2a and 2b are diagrams for explaining a general light spot position control system by a sampling servo. In this case, a tracking control system will be described as an example. FIG. 2a is a block diagram of the control system. FIG. 2b shows a time chart. In the diagrams, X denotes a tracking target position; $\Delta X$ indicates a deviation (tracking error signal); $X_s$ is a position of a light spot; and $f_s$ indicates sampling pulses. The control system comprises: a sample and hold circuit 1; a phase correction circuit 2; an amplifier 3; and an actuator 4 for tracking. At this time, as shown in FIG. 2b, assuming that the value which had erroneously been sampled for one sample period by only $\Delta e$ was held, the waveform does not become the correct value of 6-1 of $\Delta X$ as shown by a broken line but becomes the value of 6-2 which was deviated by only $\Delta X'$ to the opposite side in the sampling-error direction. When the holding time is set to T, an acceleration A which is applied to the actuator for a light spot position control by a sampling error as described above is expressed by the following equation.

$$A = \frac{2 \cdot \Delta e}{T^2} \text{ (m/sec}^2\text{)}$$

Figure 1A:
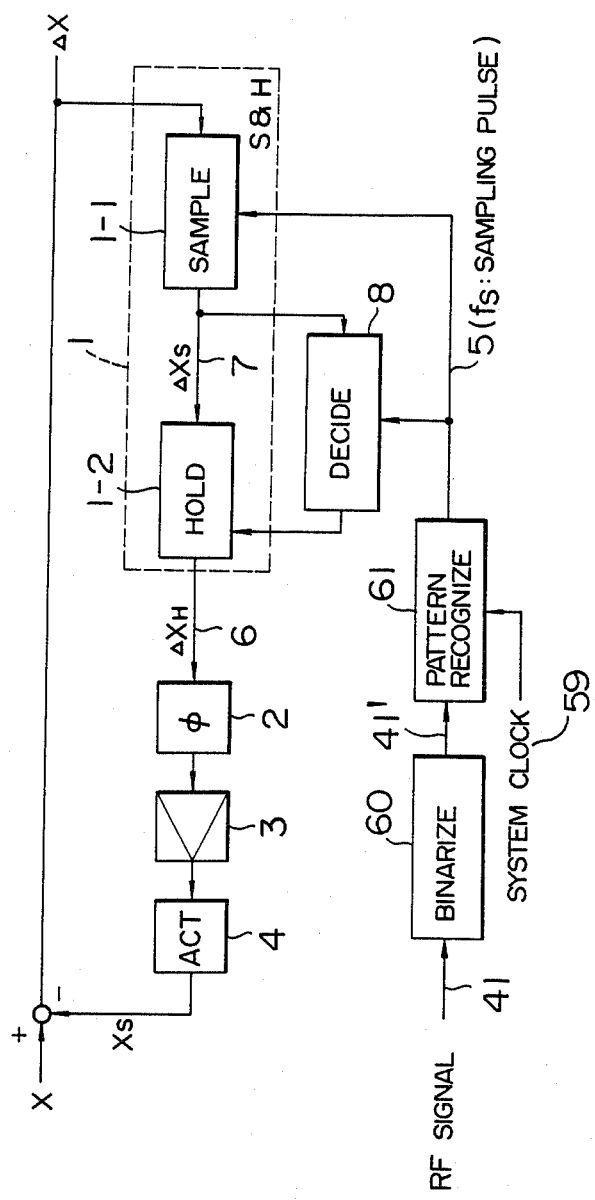
FIGS. 1a and 1b are a block diagram showing an embodiment of the present invention and a waveform diagram thereof.
Figure 1B:
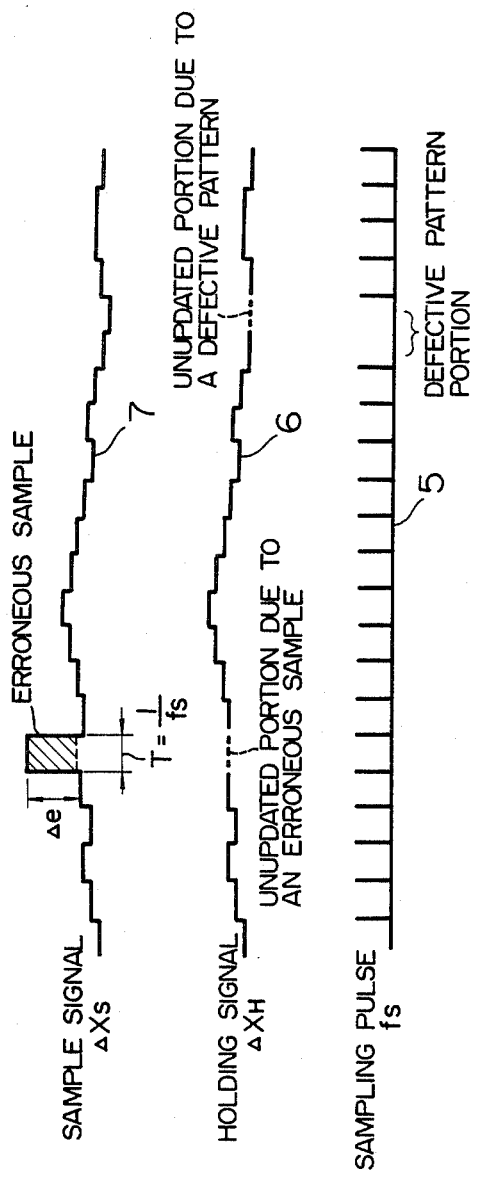

An embodiment of the tracking control system according to the invention will now be described with reference to Figs. 1a, 1b, 3a, 3b, 4, and 5a to 5p. FIG. 1a shows a block diagram and FIG. 1b shows a time chart. A difference between a tracking target X of a track and a spot locus (position of the tracking actuator), namely, a tracking error signal $\Delta X$ is sampled by a sample circuit 1-1 using a sample pulse $f_s$. A check is made by a decision circuit 8 to see if the sampled value falls within an allowable variation range or not. If YES, the sampled value $\Delta X_s$ is entered to a hold circuit 1-2. And passing through the phase compensation circuit 2, amplifier 3, and tracking actuator 4 are driven. The light spot $X_s$ is moved so that the value of $\Delta X$ decreases. In this case, if a sampled error as shown in the time chart of FIG. 1b had occurred and an impulse component such as $\Delta e$ appeared in a sample output signal 7, it is constituted in a manner such that a hold output signal 6 becomes a compensated output signal as indicated by a broken line, and the value of $\Delta X_H$ is not updated until the correct value is sampled at the next sample timing of a sample pulse 5. The acceleration A which is applied to the actuator by the sampling error is $2 \cdot \Delta e / T^2$ (m/sec$^2$) as mentioned above. Therefore, assuming that erroneous sampled value corresponding to 0.1 μm was output for the period of 33 μsec, this is equivalent to that the large force of 200 (m/sec$^2$) ω 20·G was applied to the actuator, so that the actuator is large swung.

Figure 3A:
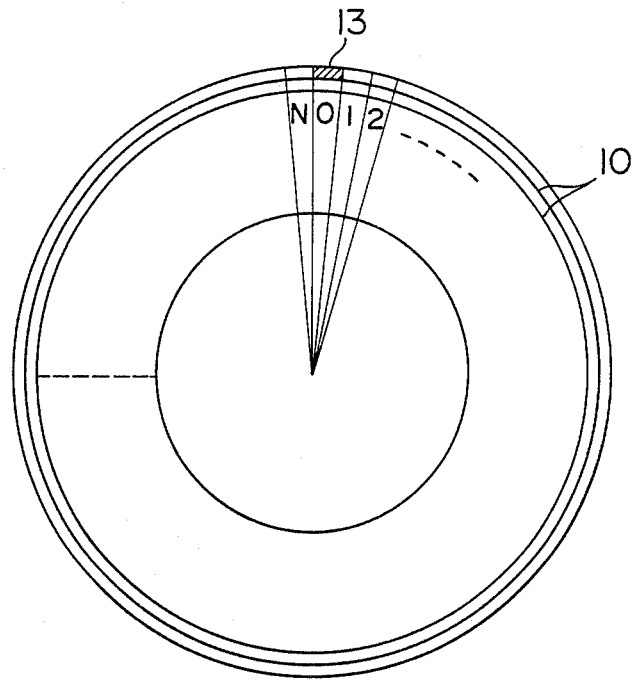
FIGS. 3a and 3b are a plan view and an explanatory diagram showing an example of an optical disc for use in the invention.
Figure 3B:
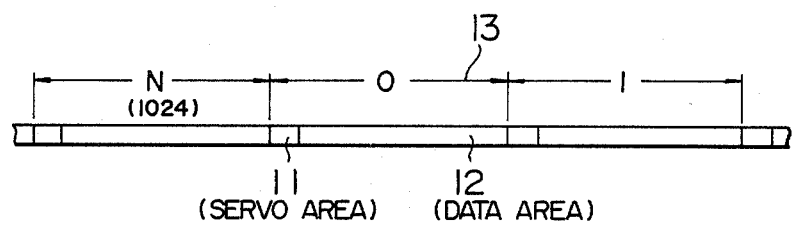
Figure 4:
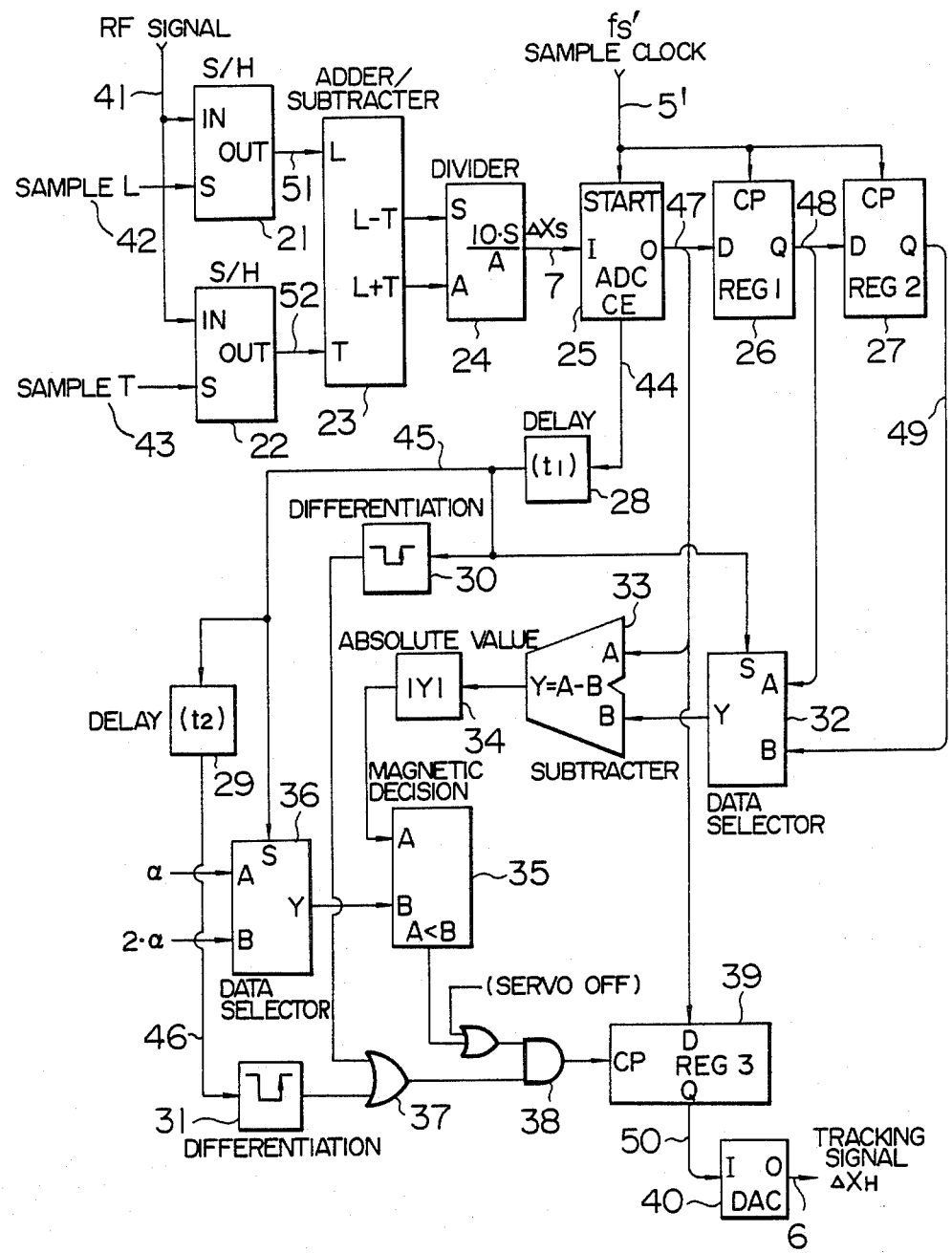
FIG. 4 is a circuit block constitutional diagram showing an example of deciding means and control signal generating means which are used in the invention.

FIG. 3a shows a plan view of an optical disc for use in the invention. For one revolution of a track 10, N (in this embodiment, N=1024) servo sectors 13 which are equally divided are arranged. Each of the servo sectors is divided into a sampling servo area (tracking error signal detection area in this case) 11 and a data area 12. On the other hand, tracking data in the servo area 11 is obtained by a prewobbling method (for example, JP-A-60-93618) whereby pits are preliminarily staggered. FIG. 4 is a block circuit constitutional diagram in the case where the sample and hold circuit 1 and dicision circuit 8 in the block diagram (FIG. 1a) were practically constituted in a digital manner. Since the tracking error detection system due to the prewobbling method is used, a sampling pulse $f_s$ in FIGS. 1a and 1b is constituted by three signals of a sample timing signal (sample L) 42 of the first wobble pit signal, a sample timing signal (sample T) 43 of the second wobble pit signal, and a recognition result output ($f_s$ 'sample clock 5') of a prewobbling mark in the constitution of FIG. 4. FIGS. 5a to 5p show waveforms in respective sections in FIG. 4. FIG. 4 will now be described hereinbelow with reference to FIGS. 5a to 5p.

Tracking data by the prewobble pits is included in the servo area portion of an RF signal 41 indicative of a total amount of reflected lights of the light spots which are obtained from the servo area 11 and data area 12 (FIGS. 5a and 5b). In this case, by setting a pit arrangement pattern in the servo area 11 into a special pattern different from those in the other portions, an abnormality of the servo area can be detected to a certain degree by the pattern recognition.

Figure 7:
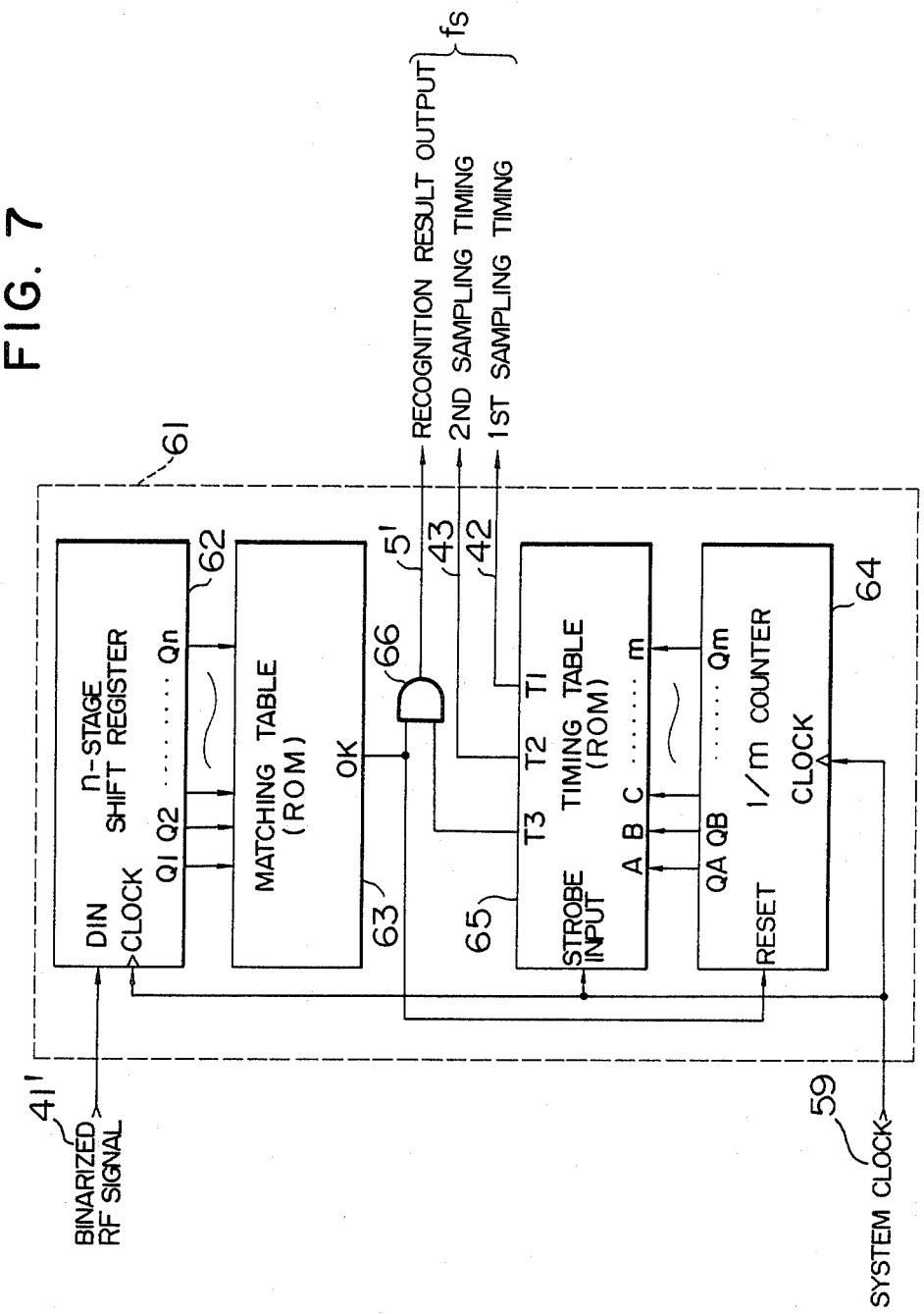
FIG. 7 is a diagram showing an example of a constitution of a pattern recognizing circuit in FIG. 1.

A pattern recognizing circuit 61 can be constituted by mainly an n-stage shift register 62 and a matching table 63 as shown in, e.g., FIG. 7. A binarized RF signal 41' obtained by binarizing the RF signal 41 by a binarizing circuit 60 and a system clock 59 are input to the recognizing circuit 61. A pattern of the servo area is stored in the matching table 63. When this pattern coincides with an output of the shift register 62, namely, with a pattern of reproduction signal, an OK signal is output. The OK signal is input to a reset terminal of a counter 64 and an AND circuit 66. An output of the AND circuit becomes the recognition result output 5' of the prewobbling mark. On the other hand, an output of the counter 64 is input to a timing table 65, thereby enabling the first and second sampling timing signals 42 and 43 to be generated. The peak value of the first wobble pit sample timing signal (sample L) 42 (FIG. 5c) is held in a sample and hold circuit 21 (FIG. 5m). The peak value of the second wobble pit sample timing signal (sample T) 43 (FIG. 5d) is held in a sample and hold circuit 22 (FIG. 5n). Outputs 51 and 52 of the S/H circuits 21 and 22 are added and subtracted by an adder/subtracter 23. An addition signal and a subtraction signal from the adder/subtracter 23 are input to a divider 24. A sample output $\Delta X_s$ (FIG. 5o) is output as a tracking error signal from the divider 24 and input to an A/D converter 25. The A/D converter 25 is made operative by the prewobble mark recognition result output $f_{s'}$, *i.e., sample clock 5'* (*FIG. 5e*). Then, the A/D converter 25 outputs a conversion end signal 44 (FIG. 5f) indicative of the end of digitization of the $\Delta X_s$ to a first delay circuit 28. The signal 44 is delayed by only the time $t_1$ by the first delay circuit 28, thereby obtaining a delayed signal 45 (FIG. 5g). The signal 45 is input to a second delay circuit 29 and is further delayed by only the time $t_2$, thereby obtaining a delayed signal 46 (FIG. 5h). The sample clock 5' is also used as a latch signal of a preceding data register 26 and a two-preceding data register 27. Immediately after the conversion end signal 44 was output, a latest tracking error sample data 47 (FIG. 5i) is stored in the output of the A/D converter 25; a preceding tracking error sample data 48 (FIG. 5j) is stored in the output of the preceding data register 26; and a two-preceding tracking error sample data 49 (FIG. 5k) is stored in the two-preceding data register 27, respectively. An interval when the output 45 of the first delay circuit 28 is at the "0" level corresponds to an interval when comparing with the preceding sample data 48. For this interval, a data selector 32 selects the preceding sample data 48. A difference between the latest sample data 47 and the preceding sample data 48 is calculated by a subtracting circuit 33 and is converted into an absolute value by an absolute value circuit 34. The resultant absolute value is input to a magnitude decision circuit 35. A variation amount $\alpha$ of samples which is permitted every unit sample (i.e., an allowable sample error amount or a value obtained by converting an allowable value of the acceleration which is applied from the outside) is selected by a data selector 36 and is supplied to one input terminal of the magnitude decision circuit 35. When the output of the absolute value circuit 34, namely, the absolute value of the difference between the latest sample value 47 and the preceding sampled value 48 is smaller than $\alpha$, an output of an A<B terminal of the magnitude decision circuit 35 is set to the "1" level. The time point of the end of the period for comparison with the preceding sample data, namely, the point at which the output 45 of the first delay circuit 28 changes from the "0" level to the "1" level is converted into a pulse signal by a differentiating circuit 30. This signal is input to an OR circuit 37. When an output of the OR circuit 37 is transmitted to an AND circuit 38, the AND circuit 38 is opened. Thus, the latest sample data 47 is latched into a register 39 to output holding data (FIG. 5l). An output of the register 39 is supplied to a D/A converter 40 to output and converted into the tracking error hold signal 6 (FIG. 5p, $\Delta X_H$). A period when the output 45 of the first delay circuit is returned to the "1" level and the output of the second delay circuit is at the "0" level corresponds to a period for comparison with the two-preceding sample data. For this period, the sampled data selector 32 selects the two-preceding data. A difference between the latest data and the two-preceding data is calculated. A check is made to see if the difference lies within a range of the value which is twice as large as the allowable sample variation amount $\alpha$ (this value is selected by the data selector 36). If it falls within this range, the timing signal indicative of the end of the period is converted into a pulse signal by a differentiating circuit 31. The latest data is latched into the register 39 in a manner similar to the case at the end of the preceding data comparison period. Namely, if the difference falls within one-sample period, the allowable sample variation range is widened to $\alpha$. If the difference lies within two-sample period, the allowable sample variation range is widened to $2\alpha$. If it falls within the set range, the holding output is updated. If it is out of the set range, the preceding data is directly used to perform the tracking. This means that, for example, when it is assumed that, in FIG. 5m, an erroneous sample occurred in the #1 wobble pit portion as shown by a broken line 51', the signal becomes $\Delta X_s$ as shown by a broken line 7' in FIG. 5o. Assuming that the difference between its value and the preceding sample value exceeds $\alpha$ as the result of the comparison and at the same time, the difference between its value and the two-preceding sample value also exceeds $2\alpha$, the value in the register 39 shown in FIG. 5l is held as it is. A waveform 6' shown by a broken line in FIG. 5p is set to a tracking error holding output.

Figure 6:
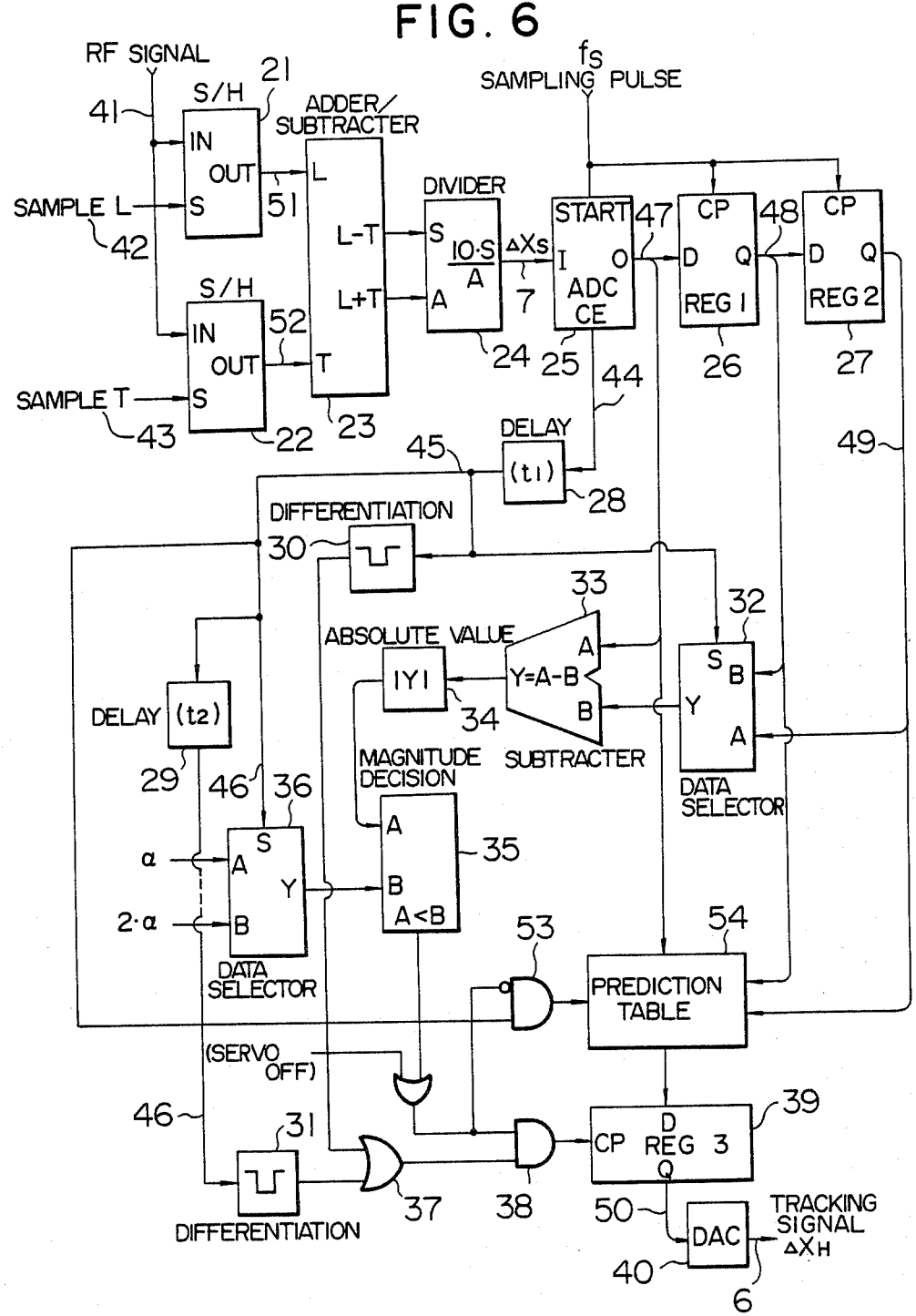
FIG. 6 is a circuit block diagram showing another example of deciding means and control signal generating means which are used in the invention.

FIG. 6 is a diagram showing the second embodiment of the invention. The second embodiment differs from the first embodiment shown in FIG. 4 with respect to that a table 54 and an AND circuit 53 are merely added. The table 54 calculates the preceding sample data 48 and the two-preceding sample data 49 and outputs a latest sampled data to be presumed. The AND circuit 53 is set to the "1" level when the sample variation exceeds $\alpha$ for the comparison period (the period when the delay circuit 28 is set to the "0" level) with the preceding data. Namely, when the AND circuit 53 outputs the "0" level signal (i.e., the variation value falls within a range of $\pm\alpha$), the latest sample data 47 is directly output to the register 39, so that the same operation as that in FIG. 4 is executed. However, when the AND circuit 53 outputs the "1" level signal (i.e., the variation value exceeds the range of $\pm\alpha$), the prediction data is output and this value is latched into the register 39 at the timing when the output of the second delay circuit 29 is returned from the "0" level to the "1" level.

According to the embodiment, when a variation of the detected erroneous sampled values is deviated from a preset range, or when the prewobble mark cannot be recognized, the holding output is not updated as shown in FIG. 1b. In addition, the prediction data which is considered to be correct is set in place of the erroneous sampled data. Therefore, the actuator to control the light spot position is not influenced by the external disturbance due to the erroneous sample. There is an effect such that the accuracy of the light spot position control of the sampling servo system is improved.

According to the invention, it is possible to prevent an unexpected force (acceleration) which is applied to the actuator for control which is caused because a variation amount of the tracking error sample values exceeds the allowable range and erroneous data is sampled. There is an effect such that the accuracy and reliability of the sampling servo system are improved. The present invention can be also applied to a focusing control.

We claim:

1. A system for controlling a position of a light spot comprising:
   a recording medium in which a servo area and a data area are alternately formed along a track;
   error detecting means for irradiating a light spot onto said recording medium and for detecting error signals, as sampled signals, from the lights obtained from said servo areas;
   deciding means connected to said error detecting means, for discriminating whether the error signal detected by said error detecting means is correct or incorrect; and
   control signal generating means for outputting as a position control signal either the error signal detected by the error detecting means or an error signal based on at least one-preceding sample value on the basis of an output of said deciding means.

2. A control system according to claim 1, wherein said deciding means comprises a differential means for calculating a difference between the output of said error detecting means and said at least one-preceding sample value and comparing means for comparing an output of said differential means with a predetermined value.

3. A control system according to claim 1, wherein said control signal generating means consists of holding means connected to said error detecting means and controls a holding operation of said holding means on the basis of the output of said deciding means.

4. A control system according to claim 1, wherein said control signal generating means has predicting means for predicting an error signal to be next detected from said at least one-preceding sample value and outputs, as a position control signal, either an output of said predicting means or the output of said error detecting means.

5. A method of controlling a position of a light spot using an optical disc in which a servo area and a data area are alternately formed along a rotating direction of a rotary recording medium, comprising the steps of:
  sampling error signals which are obtained from said servo areas;
  comparing the latest sample value with at least one-preceding sample value;
  deciding whether said latest sample value is correct or incorrect; and
  when said latest sample value is decided to be incorrect, using a preceding error signal held as a light spot position control signal without updating a current error signal holding value.

6. A control method according to claim 5, wherein a decision reference threshold value which is used to decide whether the sample value of the error signal in the servo area is correct or incorrect on the basis of a tendency of the past sample values is set into different values in at least the operative and inoperative modes and used.

7. A control method according to claim 5, wherein when it is decided that the sampled value of the error signal in the servo area is incorrect, a correct sample value is predicted from at least a past sample value and is used as a holding output signal.

* * * * *